United States Patent [19]

Kruger

[11] 4,405,699
[45] Sep. 20, 1983

[54] MANGANESE DIOXIDE ELECTRODE FOR LITHIUM BATTERIES

[75] Inventor: Franz J. Kruger, Wiesbaden, Fed. Rep. of Germany

[73] Assignee: Varta Batterie Aktiengesellschaft, Hanover, Fed. Rep. of Germany

[21] Appl. No.: 361,440

[22] Filed: Mar. 24, 1982

[30] Foreign Application Priority Data

Jun. 11, 1981 [DE] Fed. Rep. of Germany ....... 3123100

[51] Int. Cl.³ .................. H01M 4/02; H01M 4/04
[52] U.S. Cl. .................................. 429/224; 423/605; 252/182.1
[58] Field of Search .................. 429/224; 423/49, 605; 252/182.1

[56] References Cited

U.S. PATENT DOCUMENTS

| | | | |
|---|---|---|---|
| 4,133,856 | 1/1979 | Ikeda | 429/224 X |
| 4,172,183 | 10/1979 | Ruetschi | 429/224 |
| 4,216,247 | 8/1980 | Ikeda et al. | 429/224 X |
| 4,221,853 | 9/1980 | Tye et al. | 429/224 |
| 4,277,360 | 7/1981 | Mellors et al. | 429/224 X |

*Primary Examiner*—Anthony Skapars
*Attorney, Agent, or Firm*—Weiser & Stapler

[57] ABSTRACT

A positive electrode for $Li/MnO_2$ batteries uses as its active material $\gamma$-$MnO_2$, which differs from the structurally similar electrolytic or synthetic manganese dioxide through the absence of water and from its dehydration product, which is $\beta$-$MnO_2$, through better electrochemical utilization capability. The modified $\gamma$-$MnO_2$ is obtained by reduction of electrolytic manganese dioxide by means of hydrazine into $\alpha$-$MnO(OH)$ and by oxidation of the latter through tempering in an oxygen stream at about 280° C.

6 Claims, 1 Drawing Figure

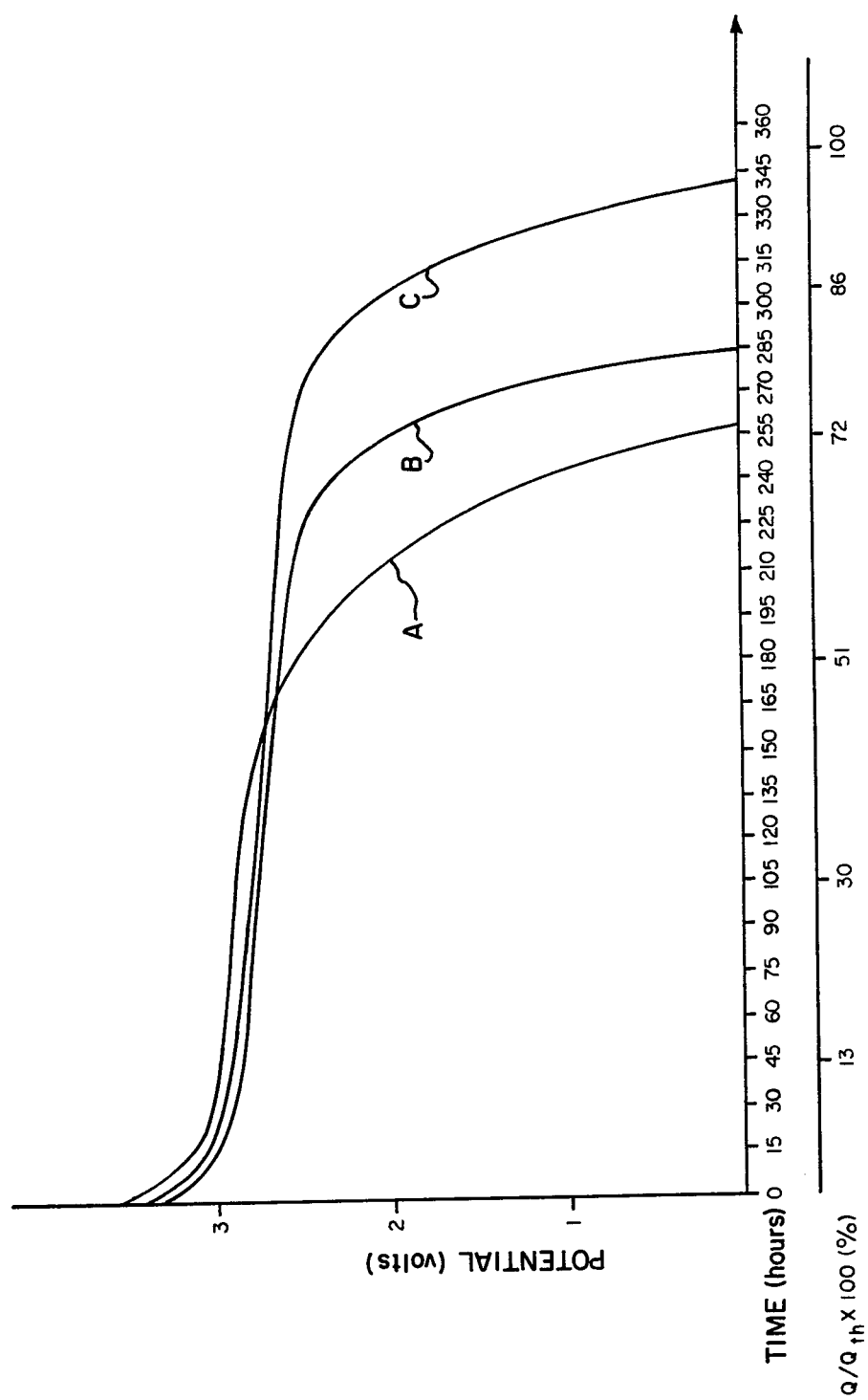

MANGANESE DIOXIDE ELECTRODE FOR LITHIUM BATTERIES

The invention relates to a positive manganese dioxide electrode for galvanic elements having a negative lithium electrode.

Through the work of Ikeda et al. (Manganese Dioxide as Cathodes for Lithium Batteries, Manganese Dioxide Symposium Volume 1, Cleveland 1975), it is known to use $MnO_2$ as positive electrode material in lithium batteries and generally in cells with non-aqueous electrolytes.

Of the various modifications of the manganese dioxide, the naturally occurring $\beta$-modification (Pyrolusite) is best crystallized. It has a rutile structure, whereas the lattices of the other modifications are derived therefrom by specific deformations, brought about by the introduction of foreign ions and water.

Furthermore, all $MnO_2$ modifications have lattice defects which are attributable to a certain oxygen deficiency. The number of lattice defects increases with the deformation of the lattice, and the chemical and electrochemical reaction capability, as well as the resulting battery activity, increase in the same sense.

In that sense, the water-containing synthetic or electrolytic manganese dioxide with $\gamma$-structure, which is also the basis for the naturally occurring ramsdellite, is particularly active. Use of the manganese dioxide as positive electrode material in cells with non-aqueous electrolytes however, makes it necessary to thoroughly de-water it. The de-watering is associated with a phase transformation according to the expression

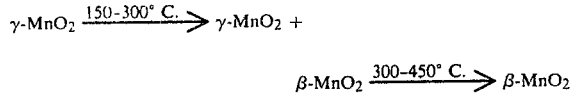

In the first step there is primarily driven off the adhering moisture, whereas in the indicated higher temperature range there also disappears the chemically bound constituent water.

U.S. Pat. No. 4,133,856 attributes to the $\beta$-$MnO_2$, which is obtained from $\gamma$-$MnO_2$ by heat treatment at temperatures of 350°–430° C., a cathode utility which far exceeds that of the starting material. Especially favorable results are achieved through heating at about 380° for 1 to 2 hours.

For the sake of good current yield in Li primary cells with positive $MnO_2$ electrodes, the present invention has the object of providing a manganese dioxide electrode whose chemical utilizability is based on a highly active $MnO_2$, which can be manufactured with minimum effort.

This and other objects which will appear are achieved in accordance with the invention by producing the active electrode material as $\gamma$-$MnO_2$ through oxidizing tempering of $\alpha$-MnO(OH).

Such an electrode is the product of a process which also embodies the invention. In it the $\alpha$-MnO(OH) has its oxidation increased through heat treatment in an oxygen stream, the oxidation product is mixed with 5 to 10% by weight of graphite and 1 to 4% of polytetrafluoroethylene, and the mixture is formed into electrode shape by compression.

First the starting material alpha-MnO(OH) is obtained by a method of preparation disclosed by H. Bode, A Schmier and D. Berndt (Zeitschrift für Elektrochemie 66, 1962, pages 586–593; English translation: Journal of Electrochemistry), from electrolytic manganese dioxide ($\gamma$-$MnO_2$) through reduction with aqueous hydrazine hydrate solution at 70° C. The resulting $\alpha$-MnO(OH) is dried at 100° C., and subsequently oxidized into the $\gamma$-$MnO_2$ embodying the invention over a period of 6 to 8 hours in accordance with the expression

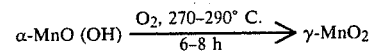

Preferably the heat treatment takes place at 280° C.

This product, whose X-ray structure data show that it is very close to the naturally occurring ramsdellite, has an analytic composition corresponding approximately to $MnO_{1.95}$. As intermediate product of the further oxidation of the $\alpha$-MnO(OH) there is formed the compound $Mn_5O_8$, which can be isolated, starting from finely crystalline $\alpha$-MnO(OH). This material possesses almost twice the specific surface (ca. 30 m$^2$/g) as the $\alpha$-MnO(OH) in its conventional form (15–20 m$^2$/g).

The surprising quality of the $\gamma$-$MnO_2$ produced in accordance with the invention, as regards its mass utilization capacity, was demonstrated through discharge experiments with Li/$MnO_2$ button cells, in which there was also used as the positive electrode material, for comparison, conventional electrolytic manganese dioxide, dried at 200° C. and $\beta$-$MnO_2$ derived from $\gamma$-$MnO_2$ at 380° C.

The button cell dimensions were 11.6 mm diameter × 5.4 mm height.

To obtain the manganese dioxide electrodes, the various manganese dioxides were produced as follows:

Type A: $\gamma$-$MnO_2$, electrolytic, dried at 200° C.

Type B: $\beta$-$MnO_2$, produced according to U.S. Pat. No. 4,133,856 from $\gamma$-$MnO_2$ at 380° C.

Type C: $\gamma$-$MnO_2$ from $\alpha$-MnO(OH), intimately mixed in accordance with the invention with 5 to 10% by weight of graphite and 1 to 4% by weight of polytetrafluoroethylene powder, and the mixture compressed into tablets. The manganese dioxide quantities in the tablets were so proportioned that the theoretical electrode capacity was 99 mAh in each instance.

As the electrolyte of the cell, there was used a 1 molar solution of $LiClO_4$ in a mixture of 70% by volume propylene carbonate and 30% by volume dimethoxyethane.

During actual discharge experiments using a current loading of 0.5 mA/cm$^2$, there were obtained the numerical values tabulated below.

| $MnO_2$-Type | Capacity (mAh) to End Potential of 2 Volts | Cathode Utilization (%) |
|---|---|---|
| A | 60 | 61 |
| B | 72 | 73 |
| C (per invention) | 85 | 86 |

For further details reference is made to the accompanying drawing wherein the single FIGURE shows the discharge characteristics of the selected types of $MnO_2$.

In the diagram there is represented the cell voltage variation (in volts) versus the discharge time (in hours) for each type of $MnO_2$. In addition, there is shown the relationship between various discharge times (45 hours, 105 hours, etc.), and the cathode utilization $Q/Q_{th} \times 100$ (in percent) achieved up to that point, where Q=the actual derived capacity, and $Q_{th}$=the theoretically achievable capacity.

The drawing particularly highlights the higher specific current yield of the $MnO_2$ of Type C embodying the invention, as compared with $MnO_2$ of Type A and B.

I claim:

1. A positive manganese dioxide electrode for galvanic elements with negative lithium electrode, characterized in that the active electrode material is a $\gamma$-$MnO_2$ produced by oxidizing tempering of $\alpha$-MnO(OH).

2. The positive manganese dioxide electrode of claim 1 wherein 5 to 10% by weight of graphite is mixed with the active electrode material.

3. The positive manganese dioxide electrode of claim 1 wherein 1 to 4% by weight of polytetrafluoroethylene powder is mixed with the active electrode material.

4. The method of manufacturing a positive manganese dioxide electrode according to claim 1 characterized in that the active electrode material is further oxidized into $\gamma$-$MnO_2$ through heat treatment of $\alpha$-MnO(OH) in an oxygen stream, the oxidation product is mixed with 5 to 10% by weight of graphite and 1 to 4% by weight of polytetrafluoroethylene powder, and the mixture is formed into electrode shape through compression.

5. The method of claim 4 wherein the temperature during the oxidizing heat treatment is at 270° to 290° C.

6. The method of claim 5 wherein the temperature is approximately 280° C.

* * * * *